(12) United States Patent
Lin et al.

(10) Patent No.: US 6,381,552 B1
(45) Date of Patent: Apr. 30, 2002

(54) METHOD FOR THE TEST OF A TESTING PLATFORM

(75) Inventors: Cheetah Lin; Yu-Li Lin; Wen-Hsin Liang, all of Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 09/340,316

(22) Filed: Jun. 25, 1999

(51) Int. Cl.[7] ................... G01M 19/00; G06F 19/00
(52) U.S. Cl. ............................. 702/123; 707/4
(58) Field of Search ..................... 702/108, 117–123, 702/182–185, 188; 714/38, 30, 46, 724, 727, 25; 324/765, 73.1; 717/4; 712/227

(56) References Cited

U.S. PATENT DOCUMENTS 5,729,555 A * 3/1998 Ichikawa .................... 714/739
6,073,085 A * 6/2000 Wiley et al. ................ 702/118
6,161,097 A * 12/2000 Glass et al. .................... 705/6
6,279,125 B1 * 8/2001 Klein ........................... 714/38

* cited by examiner

Primary Examiner—John S. Hilten
Assistant Examiner—Demetrius Pretlow
(74) Attorney, Agent, or Firm—Ya-Chiao Chang, Esq.

(57) ABSTRACT

A method for the test of a testing platform comprises a series of steps performed by a computer. Wherein the computer software structure includes a tested object menu, a plurality of test programs, a test instruction subprogram, a speech instruction subprogram, a driver program database, and a manager for receiving a test results. The method according to the present invention has several stages so that another tested object is further tested, the current test program can be used. Moreover, a speech prompt function is further provided, which may match new computer software construction.

7 Claims, 3 Drawing Sheets

METHOD FOR THE TEST OF A TESTING PLATFORM

BACKGROUND OF THE PRESENT INVENTION

The present invention relates to a test method for the test of a testing platform, the method being performed by a computer. Thereby, a user may use and maintain the method easily and conveniently.

The testing platform serves to perform test for different tested object, wherein the tested object may be for example a "flying control computer of a airplane" or "a radar system components" of a plane. Referring to FIG. 1, other than connecting a tested object 80, the testing platform 70 is also connected to a plurality of different devices 71, such as voltage measuring device, resistance measuring device, etc., while the controlling for the operation of a testing platform 70 is performed by a computer 90 to run a test program.

Since a testing platform 70 serves to test a plurality of tested objects, whereas since the prior art computer software construction is not well programmed, thus each time a new tested object is added, a whole new test program must be written for the tested object. Thus, the current test program has not been used effectively. Moreover, the current computer software construction has no speech prompt. Therefore, users often neglect some items which should be checked. Accordingly, an effective computer software program is necessary for simplifying the test method, reducing errors and easily expanding new test programs.

SUMMARY OF THE INVENTION

Accordingly, the primary object of the present invention is to provide a method for the test of a testing platform, wherein by an effective and easily maintaining computer software program, the current test instruction can be easily used in testing a new tested object.

Another object of the present invention is to provide a method for the test of a testing platform, wherein a speech prompt function is further provided. This speech prompt function may match new computer software construction.

A further object of the present invention is to provide a method for the test of a testing platform, wherein a speech prompt function is provided, thereby, a user may use the present invention accurately.

In order to attain aforementioned objects, the computer software construction in the present invention includes a tested object menu, a plurality of test programs, a test instruction subprogram, a speech instruction subprogram, a driver program database, and a manager for receiving a test result. In the present invention, a tested object menu is provided at first, then receiving the tested object selected by the user, and then test program with respective tested object is searched. The test program including a plurality of instructions comprising test instructions and speech instructions. The instructions in the test program are performed sequentially. If the instruction is test instruction, then a test instruction subprogram will be called for searching a respective test instruction subprogram database. If the instructions is speech instruction, then a speech instruction subprogram database will be called for searching respective speech instruction subprogram. Finally, the test or speech instruction subprogram calls the related driver program for driving the testing platform to performing the test operation or driving a trumpet to emit voice.

DETAIL DESCRIPTION OF THE PREFERRED EMBODIMENT

Figure 1:
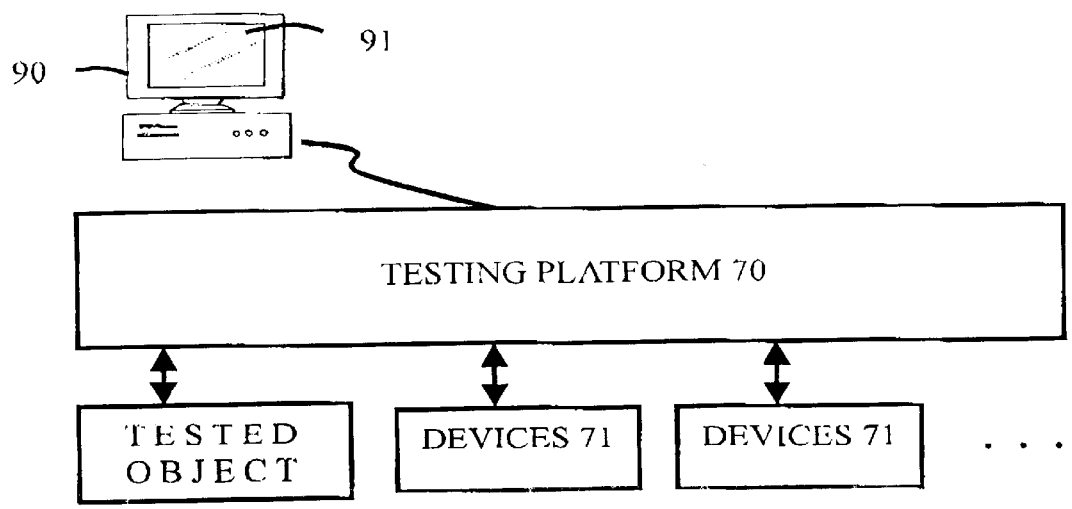
FIG. 1 shows the hardware construction of the testing method according to the present invention.

With reference to FIG. 1, it is illustrated that the hardware environment for the testing method according to the present invention is identical to that in the prior art. The testing platform 70 is connected to an object 80 to be tested and a plurality of different equipment 70. The computer 90 performs a testing program to control the action of the testing platform 70.

Figure 2:
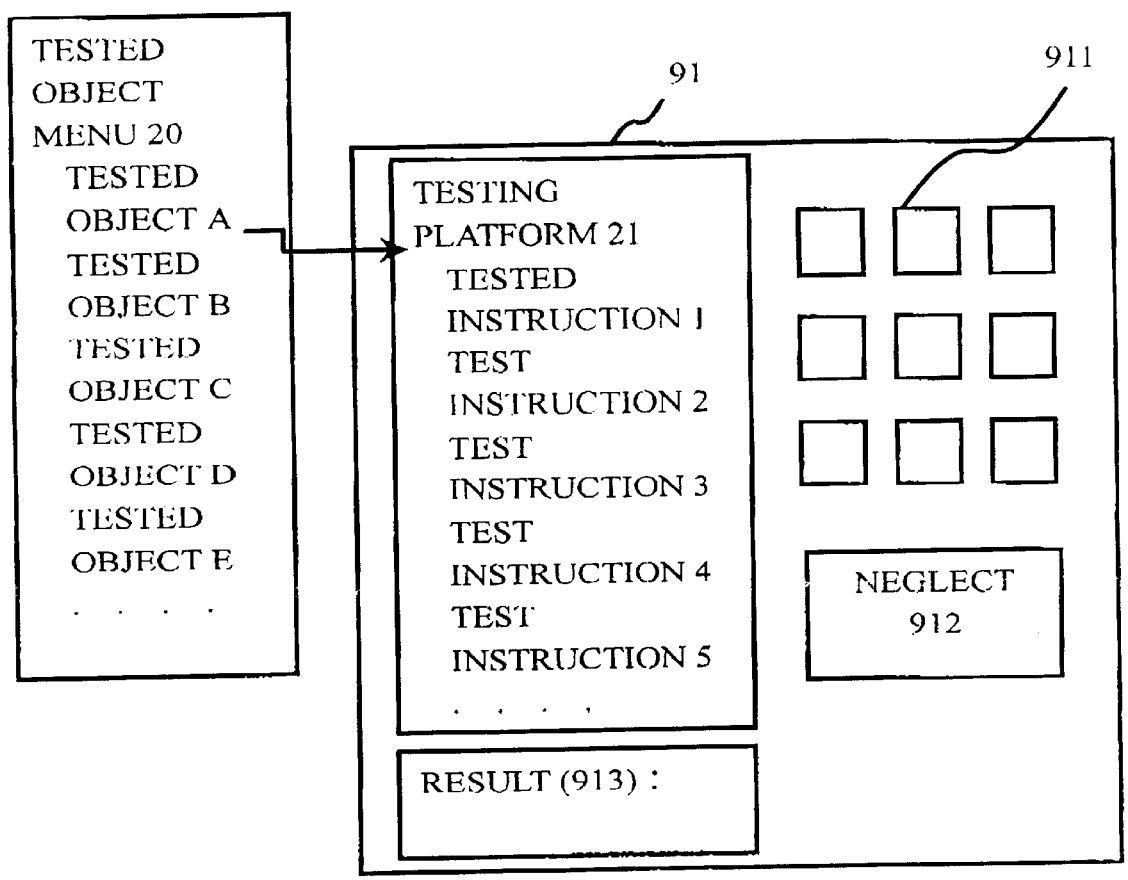
FIG. 2 is a frame embodiment displayed on a computer screen.

The screen 91 of computer 90 is shown in FIG. 2. The screen may display the menu of tested objects 20 to provide the user to select the object to be tested 80. After the tested object is selected, the screen 91 displays the tested instructions of the tested object 80, such as testing program 21, a plurality of input keys 911 (e.g. number keys) and the passkey 912. A user may neglect some test sequence by selecting the passkey 912. A result display region 913 displays the tested results. The frame of the, screen 91 may have various types, however, this is not the primary concerns of the present invention, thus it will not be described herein.

Figure 3:
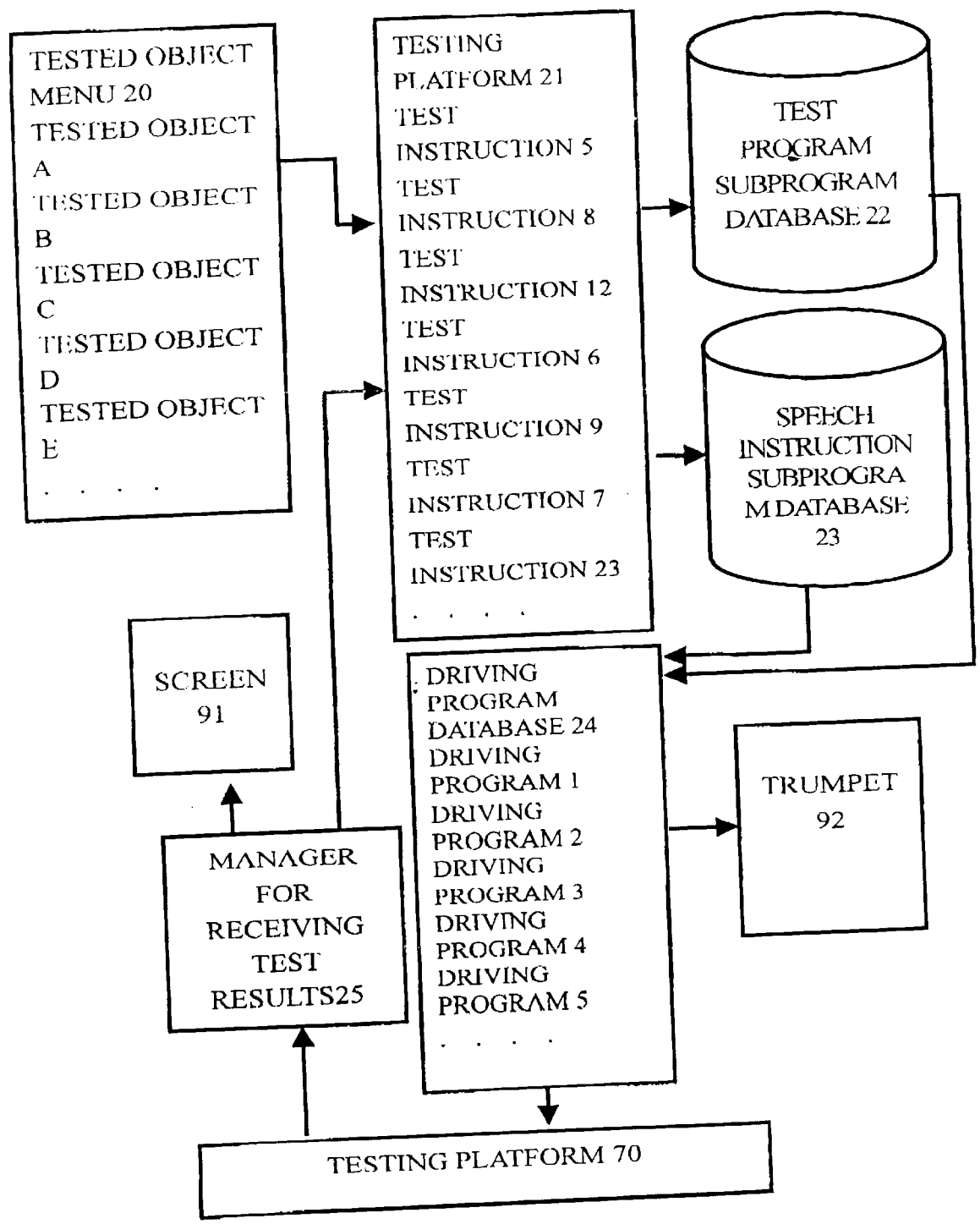
FIG. 3 is a computer software structure used in the test method of the present invention

The computer software structure used in the tested method according to the present invention is shown in FIG. 3. The computer software structure is programmed with a tested object menu 20, a plurality of testing platform 21, a tested instruction subprogram database 22, a speech Subprogram database 23, a driver subprogram database 24 and a manager of receiving testing results 25.

Figure 4:
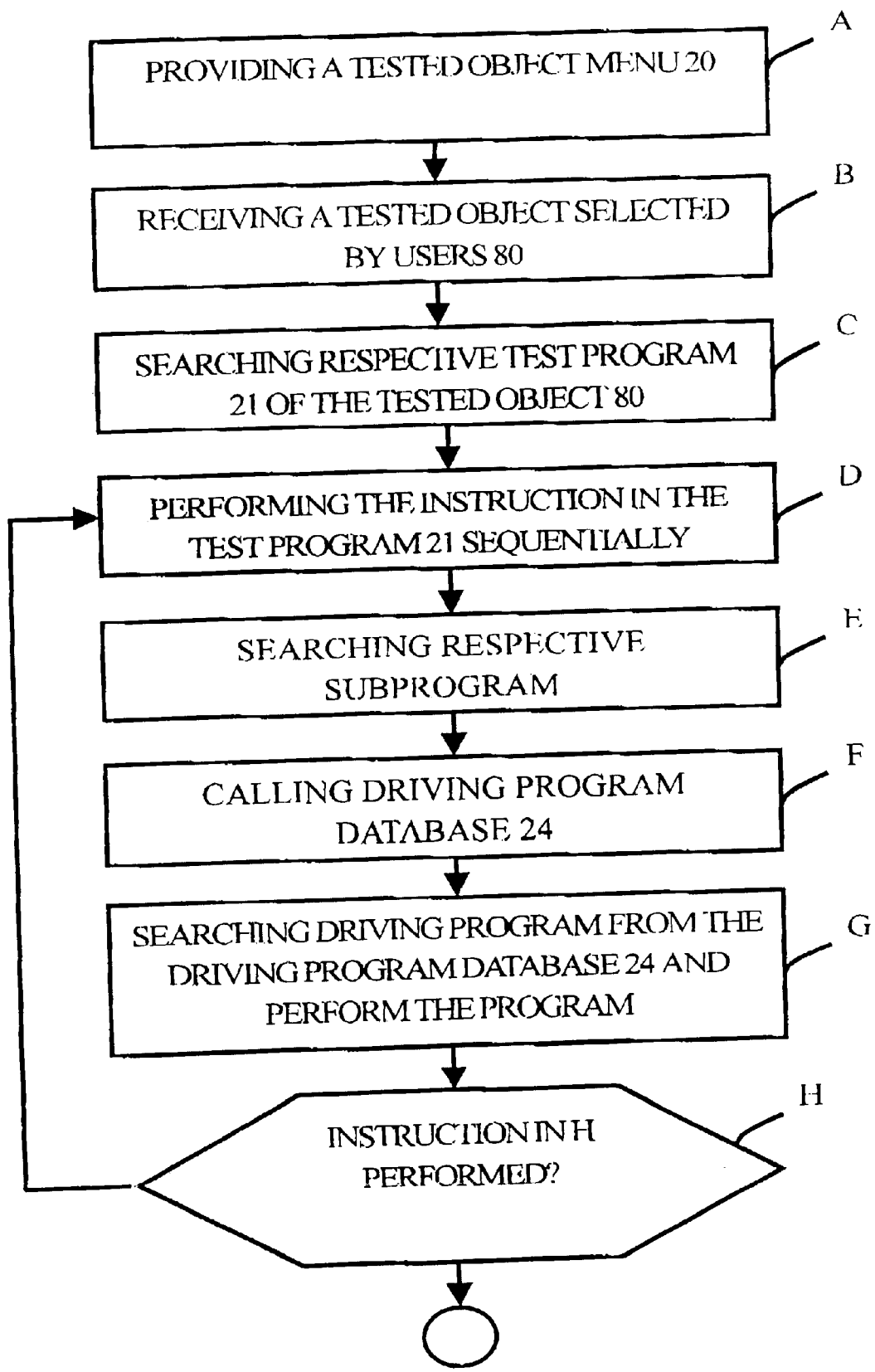
FIG. 4 is a flow chart regarding steps of the test method according to the present invention.

The steps of the testing method according to the present invention will be described in the following with reference to FIG. 4.

Step A: Providing a user testing menu 20 which is displayed in the screen 91, the testing object 20 includes a plurality of tested object menus.

Step B: Receiving the tested object 80 selected from the tested object menu 20.

Step C: Searching the test program 21 with respect to the tested object 80. For example, if the tested object B is selected as the tested object 80 to be tested, then the test program 21 of the tested object B is performed. The test program 21 includes a plurality of instructions comprising test instructions and speech instructions, for example, the test instruction 5, test instruction 8, test instruction 12, speech instruction 6, test instruction 9, speech instruction 7, test instruction 23, etc.

Step D: performing the instructions within the test program 21, for example, as the embodiment shown in FIG. 3, the test instruction 5 is performed firstly, wherein the test instruction and speech instruction are written by a high level language. For example, Measure_Resistance (parameter 1, parameter 2) represents a measured resistance, and Measure_Voltage (parameter 1, parameter 2) represents measuring voltage.

Step E: If the instruction is a test instruction, then a test instruction subprogram 22 will be called for searching respective test instruction subprogram. Namely, the test instruction subprogram 22 must include test instructions 5, 8, 12, 9 and 23. If the instruction is a speech instruction, then a speech instruction subprogram 23 will be called for searching respective speech instruction subprogram. Similarly, the speech instruction subprogram 23 includes the speech instruction subprogram listed in the test program 21.

Step F: calling driver program database 24, The driver program database 24 includes a plurality of various driver programs. In step E, the test or speech instruction subprogram includes the step of calling driver program. The driver program used in all the test and speech instruction subprogram are arranged within the driver program database 24.

Step G: Search the related driver program in the driver program database 24 desired to be performed by the test instruction subprogram or speech instruction subprogram found in Step E. If the driver program is related to the test instruction subprogram, then the driver program will drive the platform to perform testing actions. If the driver program is related to the speech instruction subprogram, then the driver program will drive a trumpet 92 to emit voice for reminding purpose or reporting the test results. In step G, the manager of receiving testing results 25 receives the test results from the testing platform. Then it displays the test result to a screen 91, or sends the test result back to the test program 21 so that the speech instruction informs the test result to the user by speech.

Step H: if the instructions Within the test program 21 have been performed completely, then the test is ended, otherwise, the process returns to step D.

Although the present invention has been described using specified embodiment, the examples are meant to be illustrative and not restrictive. It is clear that many other variations would be possible without departing from the basic approach, demonstrated in the present invention. Therefore, all such variations are intended to be embraced within the scope of the invention as defined in the appended claims.

What is claimed is:

1. A method for the test of a testing platform, the method comprising a series of steps performed by a computer, said computer serving to test the normality of a tested object through a testing platform, and prompt the user about the current test state or test results through a trumpet, wherein a tested object menu, a plurality of test programs, a test instruction subprogram database, a speech instruction subprogram, and a driver program database are programmed in the software structure of said computer, the method comprising the steps of:

step A: providing a user testing menu including a plurality of tested object menus:

step B: receiving the tested object selected from said tested object menu;

step C: searching a test program with respect to said tested object, said test program including a plurality of instructions comprising test instructions and speech instructions:

step D: sequentially performing said instructions within said test program;

step E: if said instruction is a test instruction, then a test instruction subprogram being called for searching respective test instruction subprogram, if said instruction is a speech instruction, then a speech instruction subprogram being called for searching respective speech instruction subprogram;

step F: calling a driver program database, wherein said driver program database including a plurality of various driver programs;

Step G: searching the related driver program in said driver program database desired to be performed by said test instruction subprogram or speech instruction subprogram found in Step E, wherein if said driver program is related to said test instruction subprogram, then said driver program will drive said platform to perform testing actions, and if said driver program is related to said speech instruction subprogram then the driver program will drive a trumpet 92 to emit voice;

step H: if said instructions within said test program have been performed completely, then the test is ended, otherwise, the process returns to step D.

2. The method for the test of a testing platform as claimed in claim 1, wherein a manager for receiving test results is installed in said software structure of said computer, so that in step G, said manager for receiving testing results will receive the test results from said testing platform.

3. The method for the test of a testing platform as claimed in claim 2, wherein said manager for receiving test results displays the test results after testing by said testing platform.

4. The method for the test of a testing platform as claimed in claim 2, wherein said manager for receiving test results returns said test result after testing by said testing platform to said test program.

5. A testing platform with a computer having a trumpet comprising:

a tested object menu;

a plurality of test programs;

a test instruction subprogram database comprising a plurality of test instruction subprograms;

a speech instruction subprogram database comprising a plurality of speech instructions subprograms;

a driver program database comprising a plurality of driver programs;

wherein said tested object menu, said test programs, said test instruction subprogram database, said speech instruction subprogram database and said driver program database are programmed in a software structure of said computer;

a user testing menu including a plurality of tested object menus;

a test program of said test programs corresponding to a tested object selected from said tested object menu, said test program sequentially performing a plurality of instructions comprising test instructions and speech instructions;

wherein a corresponding test instruction subprogram of the test instruction subprogram database is called and searched if one of said instructions being sequentially performed is a test instruction of said test instructions, and a corresponding speech instruction subprogram of the speech instruction subprogram database is called and searched if one of said instructions being sequentially performed is a speech instruction of said speech instructions;

wherein a driver program of said driver program database is called to drive said testing platform to perform testing action corresponding to said test instruction subprogram being called and searched, and a driver program of said driver program database is called to drive said trumpet to emit voice corresponding to said speech instruction subprogram being called and searched.

6. The testing platform of claim 5 further comprising a manager installed in said software structure of said computer for receiving test results from said testing platform.

7. The testing platform of claim 6 wherein said manager returns and displays the test results after testing by said testing platform.

* * * * *